United States Patent
Birka et al.

(10) Patent No.: US 10,055,442 B2
(45) Date of Patent: Aug. 21, 2018

(54) EFFICIENT UPDATES IN NON-CLUSTERED COLUMN STORES

(71) Applicant: Microsoft Technology Licensing, LLC, Redmond, WA (US)

(72) Inventors: Adrian Birka, Seattle, WA (US); Weiyun Huang, Seattle, WA (US); Vasileios Papadimos, Seattle, WA (US); Per-Åke Larson, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 690 days.

(21) Appl. No.: 14/529,540

(22) Filed: Oct. 31, 2014

(65) Prior Publication Data

US 2016/0125021 A1    May 5, 2016

(51) Int. Cl.
*G06F 17/30*    (2006.01)

(52) U.S. Cl.
CPC ................ *G06F 17/30345* (2013.01)

(58) Field of Classification Search
CPC ................................ G06F 17/30345
USPC ........................................ 707/692
See application file for complete search history.

(56) References Cited

U.S. PATENT DOCUMENTS

| | | | |
|---|---|---|---|
| 6,363,387 B1* | 3/2002 | Ponnekanti | G06F 17/30348 |
| 6,606,626 B1* | 8/2003 | Ponnekanti | G06F 17/30348 |
| 7,318,066 B2* | 1/2008 | Kaufman | G06F 17/30572 |
| 8,108,431 B1* | 1/2012 | Guner | G06F 17/30501 |
| | | | 707/792 |
| 9,672,222 B1* | 6/2017 | Buchman | G06F 17/30233 |
| 2001/0051944 A1* | 12/2001 | Lim | G06F 17/30575 |
| 2003/0204513 A1* | 10/2003 | Bumbulis | G06F 17/30327 |
| 2007/0203958 A1* | 8/2007 | Suzuki | G06F 11/2048 |
| 2009/0300304 A1* | 12/2009 | Boyd | G06F 17/30575 |
| | | | 711/162 |
| 2013/0179791 A1* | 7/2013 | Polski | H04L 67/26 |
| | | | 715/733 |
| 2013/0275367 A1* | 10/2013 | Shuma | G06F 17/30595 |
| | | | 707/609 |
| 2014/0136788 A1* | 5/2014 | Faerber | G06F 17/30315 |
| | | | 711/133 |
| 2014/0358876 A1* | 12/2014 | Bhattacharjee | G06F 17/3023 |
| | | | 707/695 |
| 2015/0261620 A1* | 9/2015 | Ruiz | G06F 11/1458 |
| | | | 707/649 |

(Continued)

*Primary Examiner* — Mark E Hershley
(74) *Attorney, Agent, or Firm* — Cooper Legal Group, LLC (57) ABSTRACT

The processing of transaction oriented data tends to be row-oriented, while the processing of analytical operations tends to be column-oriented. Various systems, sometimes referred to as operational data warehouses, may comprise mechanisms adapted for use in scenarios where both transactional data processing and analytical queries are to be performed efficiently. The operational data warehouse (ODW) may perform and update data efficiently by maintaining a table in structures comprising a column store, a delta store, a delete bitmap, and a delete buffer. In this environment, key values may be associated for each row such that the ODW may more efficiently seek rows. Further, rows may also be excluded from a column store based at least in part on a filter criterion. The filtering criterion may be used to filter out rows based on a created predicate set by a user or the system.

20 Claims, 8 Drawing Sheets

(56) References Cited

U.S. PATENT DOCUMENTS

2016/0259687 A1\* 9/2016 Yoshihara ............ G06F 3/0619

\* cited by examiner

EFFICIENT UPDATES IN NON-CLUSTERED COLUMN STORES

BACKGROUND

The structure of database management systems that are efficient for processing transactional data may at times be in opposition to those structures efficient for processing analytical queries. As a result, there may at times be architectural distinctions between database management systems designed for use in processing transactional data and data warehouse systems designed for performing analytical queries. Various systems, sometimes referred to as operational data warehouses, may comprise mechanisms adapted for use in scenarios where both transactional data processing and analytical queries are to be performed.

SUMMARY

Systems, methods, and computer program products related to electronic database systems are disclosed herein. Aspects of the mechanisms disclosed herein may be applied to improve update efficiency in electronic database systems. A system incorporating these mechanisms may store and retrieve data in a table stored on one or more memories. The table may be maintained as a plurality of structures, including a first, second, and third plurality of records. The first plurality of records may represent a column store that corresponds to at least a subset of a column of the table and may further comprise a first record indicative of a value of the column for a row of the table. The second plurality of records may represent entries in the column store that have been deleted, and may also represent rows that have been deleted. Entries in the second plurality of records may accessible based at least in part on a position of a corresponding entry in the column store. The third plurality of records may comprise information indicative of propagation states of a subset of rows of the table. Information in the third plurality of records may be accessible based on a key value associated with a row. The third plurality of records may represent a delta store, which may contain entries that have not yet been applied to the column store.

The system may further comprise one or more memories having computer-readable instructions stored thereon. The execution of these instructions by one or more computing devices may cause the system to receive a request to delete the row from the table. The instructions may further cause the system to determine, based at least in part on a key value, that the third plurality of records does not comprise information corresponding to the propagation state of the row.

The instructions may cause the system to store an additional record in a buffer, which may be described as a delete buffer. The additional record may be indicative of the row being in the logically deleted state, or of a record in the column store, corresponding to a row, being in the logically deleted state. The instructions may further cause the system to identify the position of the first record in the first plurality of records, and to update the second plurality of records, based on the position, to indicate that the row or column store record is in the logically deleted state.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included.

DETAILED DESCRIPTION OF ILLUSTRATIVE ASPECTS

Various aspects of the present disclosure, such as various systems, methods, and computer program products related to electronic database systems, may be employed to improve update efficiency in electronic database systems, including those that maintain tables as a plurality of structures including a row-oriented data store and a column-oriented data store. Examples include operational data warehouse ("ODW") systems, which may process both transaction-oriented data and analytically-oriented queries. Transaction-oriented data processing may tend to be row-oriented, while analytically-oriented queries may tend to be row-oriented.

A system incorporating both row-oriented and column-oriented representations may, as described herein, incorporate additional mechanisms for processing of changes to a table. Similar mechanisms may be employed in conjunction with computer-implemented methods and computer program products, such as computer-readable storage mediums bearing instructions for configuring one or more computing devices as a database management system incorporating the mechanisms.

In an aspect of the present disclosure, a table may be maintained as a plurality of structures, including a first, second, and third plurality of records. The first plurality of records may represent a column store that corresponds to at least a subset of a column of the table. A table may contain, in some cases, a large number of rows. A column store may, for various reasons, comprise segments of data for a particular column. Various mechanisms may be employed to determine how data for a column is to be segmented.

The second plurality of records may represent a delete bitmap. Entries in a delete bitmap may be indicative of rows that have been deleted, and therefore also indicative of entries in a column store that correspond to deleted rows. The entries may be accessible based at least in part on a position of a corresponding entry in the column store.

The third plurality of records may represent a delta store, which may contain information indicative of propagation states of a subset of rows of the table. Information in the delta store may be accessible based on a key value associated with a row. As used herein, a propagation state may refer to rows, columns, or values corresponding to the same, that have not yet been moved to the column store. This may, for example, occur when a row has been modified, for example, by insertion of a new row or modification of an existing value. An entry may be placed in the delta store to indicate that corresponding entries in the column store should be updated to reflect the changes. Entries may, however, be placed in the column store for other reasons. In general, a delta store may be described as containing data that is virtually associated with a column store, but that has not yet been moved, converted, copied, or migrated to the column store. These types of actions may be referred to as propagating values from a delta store to a column store. Note that in some cases, only a subset of columns of a row may be propagated. The propagation may be considered complete if all of the columns that are intended to be propagated to a column store have been propagated. Columns may be excluded from propagation. However, once all of the intended rows have been propagated, the propagation of that row may be considered complete.

The system may receive a request to delete the row from the table. In response to receiving the request, the system may use a key value corresponding to the row to determine that the row is not represented in the delta store. If not present in the delta store, the row may be located in the column store. In response, the instructions may cause the system to store an additional record in a delete buffer. The additional record may be indicative of the row being in the logically deleted state. The instructions may further cause the system to identify the position of the first record in the column store, and to update the second plurality of records, based on the position, to indicate that the row is in the logically deleted state. Note that, depending upon context, the term "row" has used herein may refer to column store entries, and not necessarily to a row of a table in its entirety. For example, only a subset of columns of a table may be stored in column stores. In addition, a row of a column store may be considered logically deleted, in some cases, even when the corresponding row in a table has not been deleted. This may occur, for example, when it is determined that a particular column is to no longer be maintained in a column store.

Further aspects of the present disclosure may comprise deleting the additional record from the delete buffer in response to updating the delete bitmap. This may be performed on an atomic basis, so that a record is not deleted from the delete buffer unless it is also added, as part of an atomic transaction, to the delete bitmap. Entries in the delete map may further, in some aspects, correspond only to committed entries in a column store.

Further aspects of the present disclosure may comprise determining that the row has been deleted by consulting at least one of the delete buffer or the delete bitmap. An indication in either structure may indicate that a row is in a logically deleted state.

In some cases, the delete bitmap may comprise a set representation, wherein a member of the set representation is accessible based at least in part on the position of the first record in the plurality of records. A delete bitmap might also comprise a set representation.

A further aspect of the present disclosure may comprise determining to exclude one or more rows of the table from a column store based at least in part on a filter criterion. The filter criterion may be selected based at least in part on a frequency of changes to the subset of rows. In other words, the criteria may be selected based on the data potentially being subject to a created predicate as set forth by a user or the system itself.

A further aspect of the present disclosure may comprise storing a sequence number with the additional record; and determining that the row is in the logically deleted state based at least in part on the sequence number.

As used herein, the term "table" may refer to various organizational structures maintained on a volatile or non-volatile memory device and used in conjunction with the storage and retrieval of data. A table may refer to a collection of data, including primary and secondary indexes. A primary index may include all of the rows and columns of a table. A secondary index may refer to a subset of the rows and columns of a table. As used herein, however, the term "table" may be used to refer to any of these structures.

Database systems have traditionally stored data row-wise, meaning that the values for all columns of a row are stored together in a record. A data store storing data in a row-wise manner may be referred to as a row store. Data may also be stored column-wise, meaning that values from the same column of a row may be stored in a columnar array or a collection of columnar array segments. A data store storing data in a column-wise manner may be referred to as a column store.

An index stores data from one or more columns of a set of rows in a database table. An index can be organized as row store, typically implemented as a B-tree or other mechanism in which data may be accessed by as a key value. An index may also be organized as a column store.

Column store indexes may be optimized for scans. A scan of a column store may be more efficient than a scan of a row store for various reasons, such as not having to fetch data for columns that are not used in the execution of the current query. Column stores may, in some cases, be compressed more efficiently than row stores due to homogeneity of data values in the same column. Column stores may also achieve better compression because the unit of compression in column stores is typically larger than what may be used in row stores.

However, column store delete and update performance may be inefficient. First, data from the same row may be spread over multiple column arrays, which may, in some cases, make it impractical to update data in place. Second, column store indexes do not typically organize rows in a manner that supports efficient retrieval based on key value, and various update or delete operations may utilize retrieval based on key value. Accordingly, locating an individual row in a column store index based on its key value may be expensive. Third, data in a column store or column store segment may be compressed, and may typically be uncompressed in order to enable a seek operation.

Accordingly, finding a single row in a column store, either as part of a selective query or as part of deleting or updating that row, can in some cases be inefficient. The inefficiency may come from the requirement of the system to do a full scan of the column store. A system may improve scan efficiency by segmentation of a column store and maintenance of range information pertaining to each segment.

However, a scan of a single column store may nevertheless be less efficient than, for example, a seek operation.

Further, column store indexes can be used effectively for simultaneous usage of online transaction processing ("OLTP") and data warehousing despite their lack of support for efficient deletes and updates. Simultaneous usage of OLTP and data warehousing may cause data to have varying "temperatures." Some rows may be "hot," meaning there is a high probability that they will soon be modified by the system workload. Other rows may be "cold," meaning that they are less likely to be modified again. Cold data may be historical data kept for purposes such as analysis and reporting. Aspects of the present disclosure may be employed to segregating data by temperature, such that the column store may contain mostly cold data.

In the following description, operational terms such as "update," "delete," "insert," "scan," and "seek" are used in the following description for the purpose of providing relative reference only, and are not intended to suggest any limitations. Thus, these descriptions are merely general database operational processing terms and it is well known that other terms may also be used to depict similar operational meaning in a database system.

Figure 1:
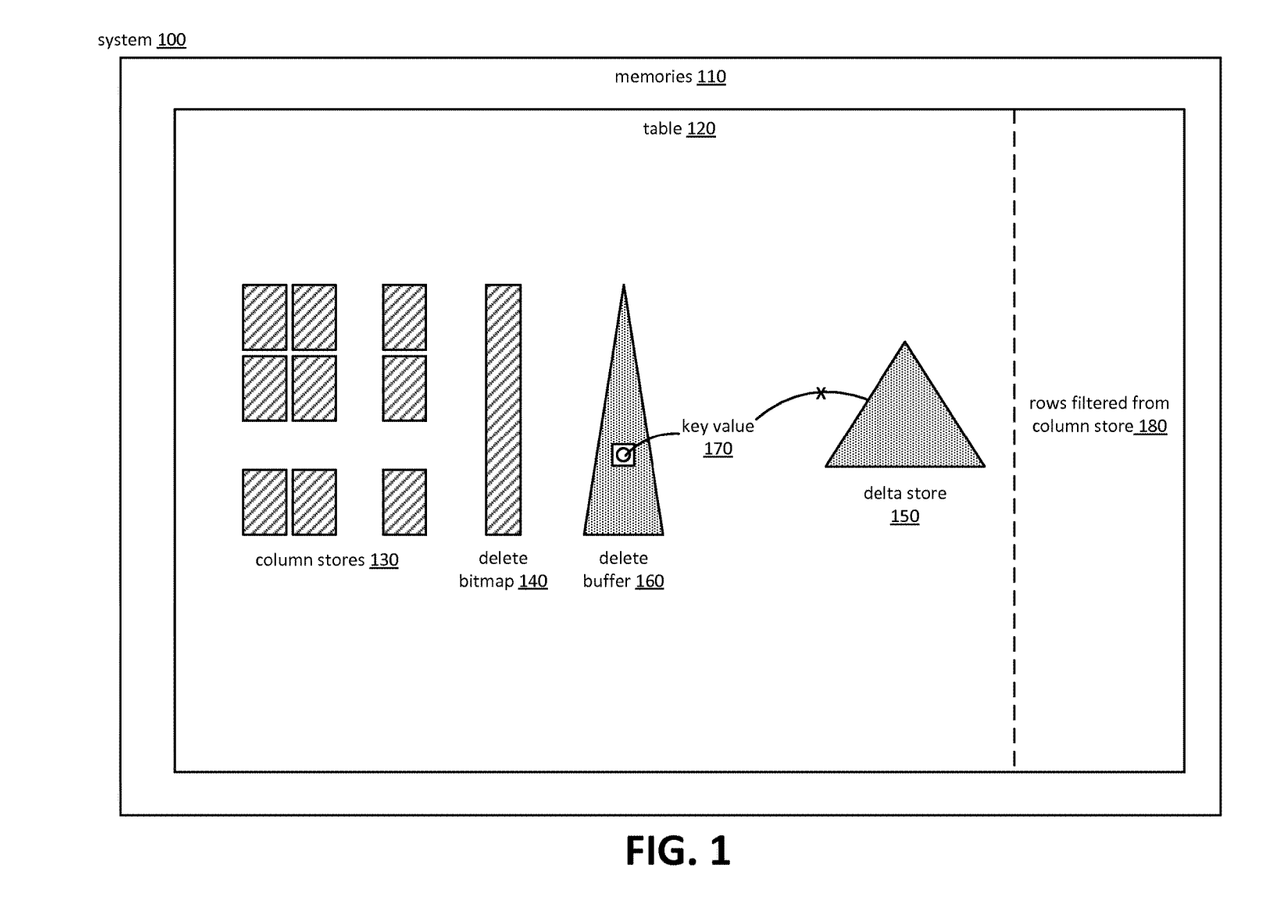
FIG. 1 is a diagram to illustrate an aspect of a system efficiently updating data.

Referring now to FIG. 1, FIG. 1 depicts an aspect of a data warehouse system 100 with improved update efficiency and one or more memories 110 with computer-readable instructions stored thereon that may execute on the system 100. The system 100 may comprise of one or more computing devices (not pictured). The one or more computing devices may be activated and may maintain at least one table 120. The table 120 may be stored in memories 110, which may include both volatile and non-volatile memories, in various combinations. Column stores 130, for example, may be maintained in a non-volatile memory 130 while delta store 150 may be maintained in volatile memory.

The table 120 may be structured as a plurality of records (130, 140, 150, and 160). The first plurality of records 130 may correspond to a column of the table 120 and may comprise of a first record indicative of a value of the column for a row of the table 120. The column store 130 may store data in a column-wise fashion. In some instances, the column store 130 may be compressed.

The system may maintain the second plurality of records as a delete bitmap 140, which may be indicative of logically deleted states for some subset of rows of the table 120, or of logically deleted states for some subset of column store entries. Entries in the second plurality of records may be accessible based at least in part on a position of the first record in the column store 130. A record in the delete bitmap 140 indicates the position of a row that in the column store 130 is in the logically deleted state.

The system may comprise a delta store 150 that comprises information indicative of a propagation state of some subset of rows of the table 120. A propagation state may refer to the status of the row regarding its propagation to the delta store. An entry in delta store 150 may indicate that a row has been changed recently, e.g. by being inserted, updated, or deleted. The entry may further indicate that the change to the row is not yet reflected in column stores 130.

The information in delta store 150 may be accessible by key value 170. For a given row, this may be the same key value 170 used to access a corresponding entry in delete buffer 160. A delta store 150 may store the data in a row-wise fashion, and may be referred to as a row store. A delta store 150 may comprise various structures, such as B-trees, hash tables, heaps, and so on. Various mechanisms for accessing records based on a key value may be included in delta store 150.

Furthermore, the contents of the delta store 150 may be converted and stored in a column-wise fashion through in the column store 130. The conversion may be performed in a background thread. In the background thread, a tuple mover (not pictured) may be used to periodically perform the conversion of data. For example, rows stored in the delta store 150 may be converted into additional column arrays segments, the additional column array segment may be stored in the column store 130, and the converted rows may be removed from the delta store 150, thereby "emptying" the delta store 150. The conversion of rows from row-based storage at the delta store 150 to column-based storage at the column store 130 may be triggered by several events. For example, the conversion may be triggered in response to determining that a number of rows in the delta store 150 is greater than a threshold (e.g., one million rows), determining that a time period has elapsed, or receiving a user command (e.g., a database administrator command) to perform the conversion or compression. Thus, the delta store 150 may be either in a compressed form or not in a compressed form.

A delete buffer 160 may comprise a repository for rows that have been deleted but whose deletion state has not been applied to either of delete bitmap 140 or column stores 130. Like delta store 150, delete buffer 160 may be accessible by key value, and may comprise a tree structure, hash table, heap, and so on. As depicted in FIG. 1, a row in delete buffer 160 may be accessed by the same key value 170 usable to access a row in delta store 150.

The system depicted by FIG. 1 may receive a request to delete a row from table 120. If the row has been recently updated, and any corresponding changes not yet migrated to column stores 130, and entry may be present in delta store 150. In some cases, the row might not have been recently modified, in which case an entry corresponding to the row may not be present in delta store 150. When an entry corresponding to a row is not present in delta store 150, it may be an indication that columns for the row are present in column stores 130. Whether present in the delta store or not, the delete buffer 160 may have stored within it an additional record indicating that the row has been deleted. Subsequently, a background thread or other process may identify a position in delete bitmap 140 corresponding to the row, update delete bitmap 140 to indicate that the row has been deleted, based on the position in delete bitmap 140, and remove the additional record from delete buffer 160.

Figure 2:
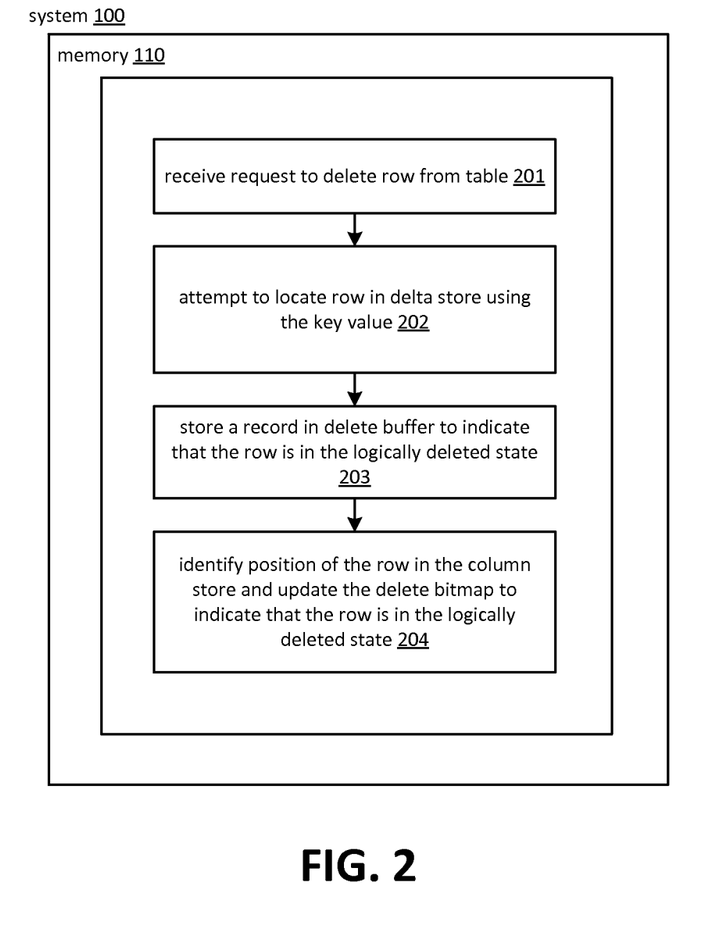
FIG. 2 is a diagram to illustrate an aspect of a memory that contains instructions to cause the system to perform efficient updates.

Further depicted in FIG. 1 and now referring to FIG. 2, the one or more memories 110 may contain computer-executable instructions stored thereon. Through the execution by the one or more computing devices, block 201 describes that the system 100 may be directed by the instructions to receive a request to delete the row from the table 120. The request may also be an indication or determined by the user or the system itself. Accordingly, execution of the instructions may cause the system 100 to perform a delete operation based on the receipt of the request to delete a row from the table 120. An aspect regarding that of the system 100 processing the request to delete the row from the table 120 will be further described below. Note that although the blocks 201-204 are depicted as a sequence, in various aspects the operations depicted in blocks 201-204 may be altered, omitted, supplemented with additional operations, or performed in parallel. Accordingly, the depicted order should not be construed as limiting the scope of the present disclosure.

Block 202 describes that the instruction may also direct the system 100 to attempt to locate the row in the delta store 150 by using the key value 170. The delta store 150 may comprise a plurality of records indicative of propagation states of rows of the table. In addition, the presence of a record in the delta store may be used to avoid an immediate scan of the column store while processing the delete.

Block 203 describes that the instruction may further cause the system 100 to store a record in a delete buffer 160 (as shown in FIG. 1). The additional record may include information indicating that the row or column store entry is in a logically deleted state. The delete buffer 160 may store the data in a row-wise fashion, and may be accessible based on key value 170. For example, the delete buffer 160 may be implemented in ordered fashion (e.g., as a B-tree) or unordered fashion (e.g., as a heap). Entries in a delete buffer 160 may be stored with a sequence number. The sequence number in the delete buffer 160 may be associated with a sequence number in a column store. If a row with a key value "K" and a sequence number "S" appears in the delete buffer, then every entry in a column store segment that corresponds to the row with key "K" and has a sequence number less than or equal to "S" may be in a logically deleted state.

Records maintained in the delete buffer may be referenced by system 100 in connection with transferring the deleted state indicated by the delete buffer 160 to the delete bitmap 140. The transfer of the deleted state information may be performed periodically. In another instance, the transfer of additional records may be performed as set forth by an instruction determined by a client of the system or the system itself. The instruction to transfer additional records from the delete buffer 160 to the delete bitmap 140 will be described in more detail below in FIG. 3A.

Additionally, block 204 describes that the instructions may cause the system 100 to locate or identify the position of the row in the column store 130 and update the delete bitmap 140 to indicate that the row or column store entry is in the logically deleted state. The update operation of the delete bitmap 140 may be based upon the position of the first record in the column store 130. The update operation of the delete bitmap 140 may also indicate the row of the table 120 that is in a logically deleted state based on the transferred additional record from the delete buffer 160. The deleted state information transferred from the delete buffer 160 to the delete bitmap 140, provides a further indication that the row is in the logically deleted state, in a manner that is determinable based on position in the column store 130 rather than based on the key used to access records corresponding to the row in the delete buffer 160 and delta store 150. Accordingly, the transfer of deleted state may comprise a conversion from a key-based indication of deleted state to a position-based indication.

Thus, the combination and the utilization of the column store 130, the delete bitmap 140, the delta store 150, and the delete buffer 160 may provide the system 100 an environment for efficiently updating data.

Figure 3A:
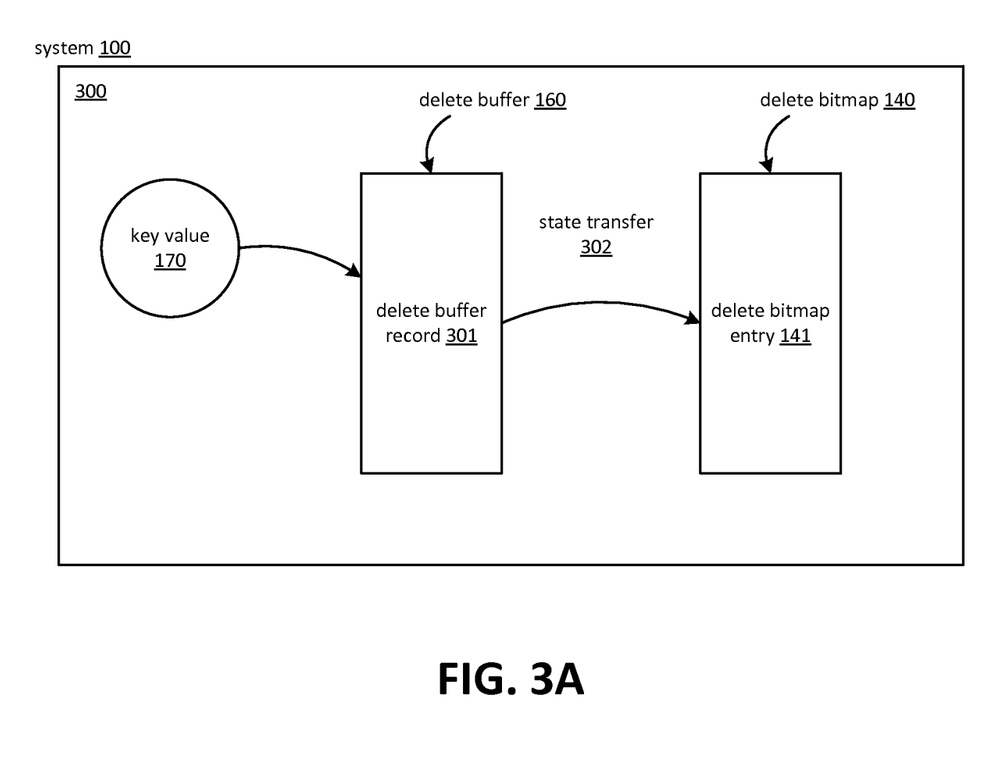
FIG. 3A is a diagram to illustrate an aspect of the system storing an additional record.

FIG. 3A depicts a block diagram of state transfer between a delete buffer 160 and a delete bitmap 140. As noted, a delete buffer 160 may be utilized to avoid scans of a column store which might otherwise be performed.

A delete buffer 160 may comprise a tree structure, hash table, heap or other structure. The delete buffer 160 may be accessible by a key value 170, and may further be optimized for location or retrieval of records stored within delete buffer 160 based on the key value. In various aspects, delete buffer 160 may be configured for improved efficiency regarding confirmation of the presence of a record corresponding to key value 170. For example, a tree may be constructed based on key values as indices, and in an ordered fashion in which keys are stored so that key values associated with descendant nodes may be inferred from those of their parents—thus reducing traversal costs.

A delete bitmap 140 may comprise an array or other set representation in which members of the set may be accessed based on position. The position may correspond to a position of a record in a column store. For example, the $N^{th}$ record of a column segment might correspond to the $N^{th}$ row of a table, and might further correspond to the $N^{th}$ bit position in delete bitmap 140. The $N^{th}$ position in delete bitmap 140 might be referred to, for demonstrative purposes, as delete bitmap entry 141. When set, it may indicate that the $N^{th}$ record of the column segment corresponds to a deleted row. Note, however, that this example is intended to be illustrative of a principle of operation of delete bitmap 140, and should not be viewed as limiting the scope of the present disclosure. Various mechanisms may be employed to provide set representations addressable by position, such as sparse matrices, hash tables, and so forth. In various aspects, a delete bitmap 140 may be maintained in volatile memory, or in non-volatile memory.

The row from the table 120 that is in the logically deleted state might be directly inserted into delete bitmap 140 in response to receiving a request to delete a corresponding row. However, this approach may involve scans of a column store to locate positions of deleted records. In an aspect of the present disclosure, a delete buffer record 301 may be added to delete buffer 160 in response to receiving a request to delete a row. This may occur prior to an update of delete bitmap entry 141 in delete bitmap 140. For example, the system 100 may insert delete buffer record 301 into delete buffer 160.

A subsequent process may retrieve delete buffer record 301 using a key value 170. Accordingly, the delete buffer 160 may then periodically update delete bitmap 140 based on the contents of delete buffer record 301. The transfer of additional records may be performed by a tuple mover which may periodically empty delete buffer 160 while logically inserting deleted row into the delete bitmap 140. The tuple mover may also cause rows in delta store 150 to be migrated to column stores 130. The delete bitmap 140 would then contain only the committed deleted rows from the table 120 that are in the logically deleted state. A scan of the corresponding table, as might be performed during a query, might then be performed as described in further detail in FIG. 3B below.

Figure 3B:
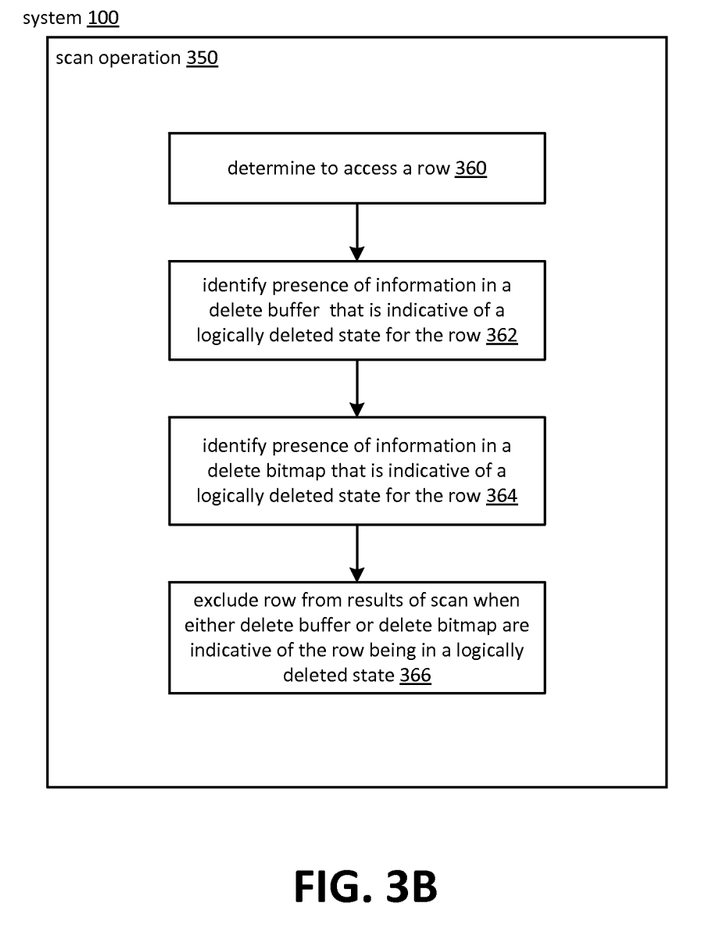
FIG. 3B is a diagram to illustrate an aspect of the system performing a scan of the data.

Referring now to FIG. 3B, there is depicted a flowchart of instructions that may be executed by the one or more computing devices to cause the system 100 to perform a scan of the table 120. Although elements 360-368 are depicted as a sequence, in various aspects the operations depicted in blocks 360-368 may be altered, omitted, supplemented with additional operations, or performed in parallel. Accordingly, the depicted order should not be construed as limiting the scope of the present disclosure.

Referring to block 360, instructions for performing a scan operation 350 may comprise determining to access a row. This may, for example, comprise determining to scan from a previous row to a current row. It might also comprise determining that a row comprises values consistent with a filtering criteria associated with the query.

Referring to block 362, instructions for performing scan operation 350 may comprise identifying the presence of information in a delete buffer that is indicative of a logically deleted state for a row. In some cases, the delete buffer may comprise information indicating that the row has been deleted. In other cases, the delete buffer may comprise information indicating that the row has not been deleted. In an aspect, a delete buffer may comprise a record corresponding to a particular row only when that particular row has been deleted. For another, non-deleted row, the absence of the entry may comprise information indicative of the row not having been deleted.

Referring to block 364, instructions for performing scan operation 350 may comprise identifying the presence of information in a delete bitmap that is indicative of a logically deleted state for the row. In some cases, the delete bitmap may comprise information indicative of the logically deleted state for a row, while in other cases the delete bitmap may comprise information indicating that the row is not in a logically deleted state. For example, a bit might be set to "1" in the delete bitmap to indicate that the row has been deleted, or set to "0" to indicate that the row has not been deleted. In some aspects of the present disclosure, some other set representation may be used. It may be the case that the presence or absence of a record in the delete bitmap may indicate that the row is or is not in a logically deleted state.

Referring to block 366, instructions for performing scan operation 350 may comprise excluding the row from the results of a scan when either the delete buffer or the delete bitmap contain information that is indicative of the row being in a logically deleted state.

Figure 4:
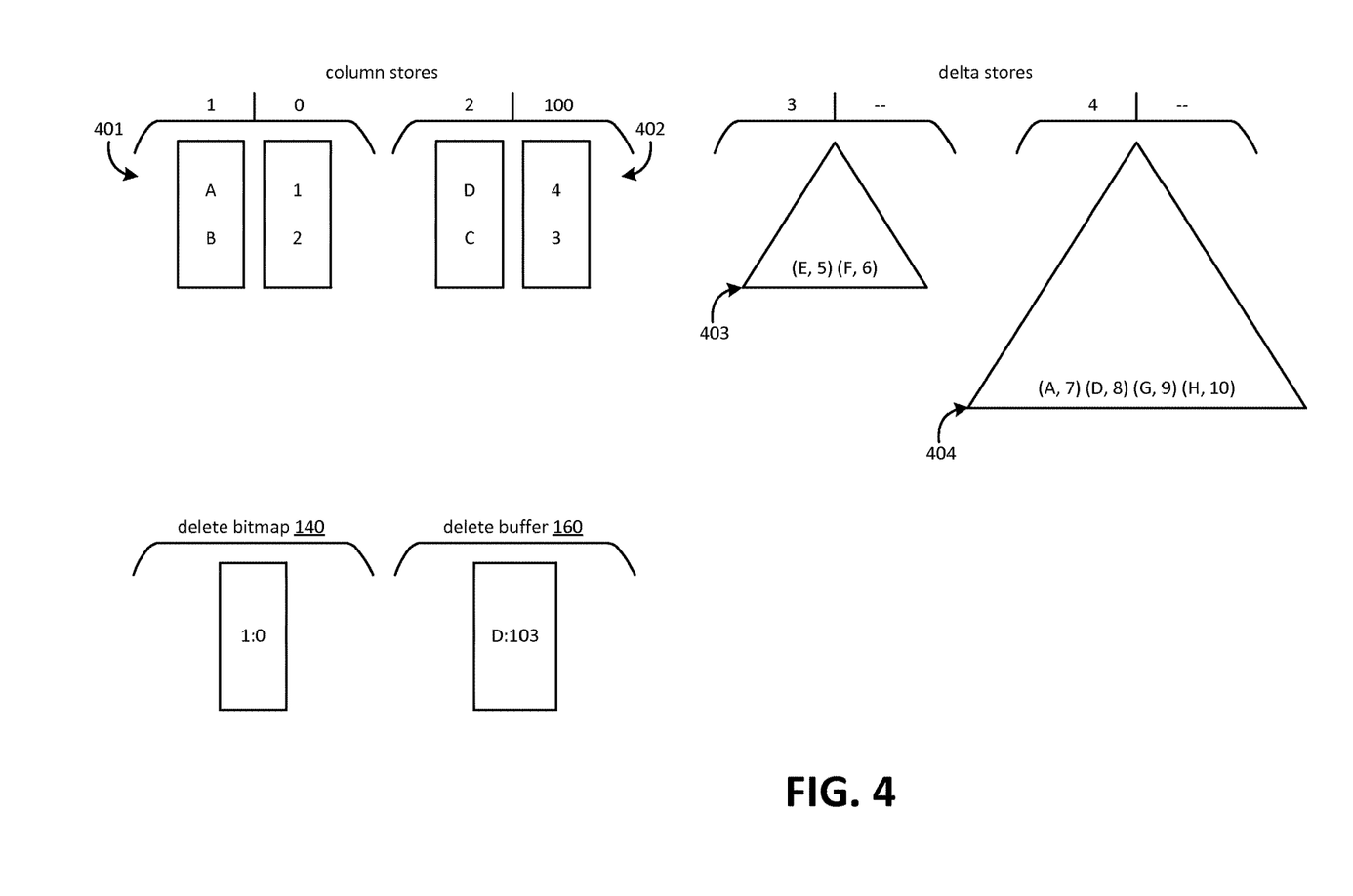
FIG. 4 is a diagram to illustrate an aspect of an electronic database system prior to an update operation.
Figure 5:
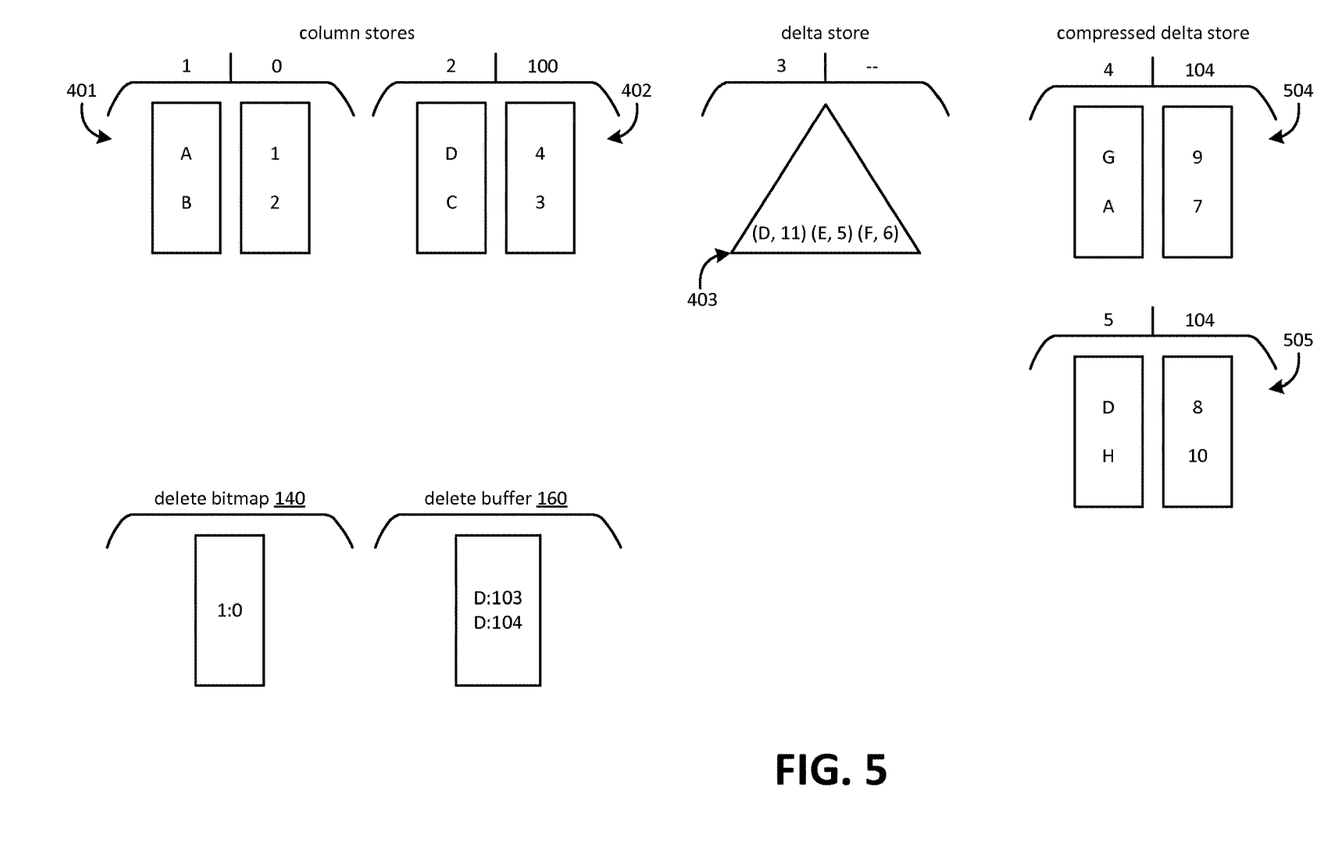
FIG. 5 is a diagram to illustrate an aspect of an electronic database system after an update operation.

FIGS. 4 and 5 depict the preferred aspect in further detail of a system 100 with instructions stored on the one or more memories 110 that, when executed, provide for efficiently updating a table 120. FIG. 4 shows an illustration of two compressed row groups 401 and 402, respectively. Row group 401 may have sequence number "0", indicating that it was constructed during index build. Row group 402's sequence number may be "100", indicating that the tuple mover (not pictured) may have created it at some later time. There are also two delta store row groups, 403 and 404, with null sequence numbers indicating that they may be mutable. Since there may be one or more delta stores, row group 404 may grow to contain enough rows to fill two compressed row groups. There may be at least one entry in the delete bitmap 140, indicating that the first row in row group 401, (A, 1), has been deleted. There may be at least one (key, sequence number) pair in the delete buffer 160, indicating that all rows with key "D" in immutable row groups whose sequence number is "103" or less have been deleted.

Now further looking to FIG. 5, the tuple mover (not pictured) may begin to compress delta store 404. It may increment the highest assigned sequence number to "104" and assign it to the delta store 404, thus marking it as immutable. While the delta store 404 is being compressed, row (D, 8) gets updated to (D, 11). The update may split into a delete followed by an insert. As described above, the aspect of a process to perform a delete operation may consist of a seek, and the seek may be processed through delta stores seeking for the key "D." If key "D" is not found in delta store 403 and delta store 404 may be immutable then the highest assigned sequence number, "104," may insert "D:104" in the delete buffer 160. The insert, (D, 11), may be placed in delta store 403. Finally, the tuple mover may finish compressing delta store 404, and replace it with compressed row groups 504 and 505, both with sequence number "104."

In various aspects, sequence numbers may be associated with entries in a delete buffer. If a row with a key "K" and sequence number "S" is represented in the delete buffer, then every row with key "K" in a column store segment with a sequence number less than or equal to "S" may be determined to be in a logically deleted state.

Figure 6:
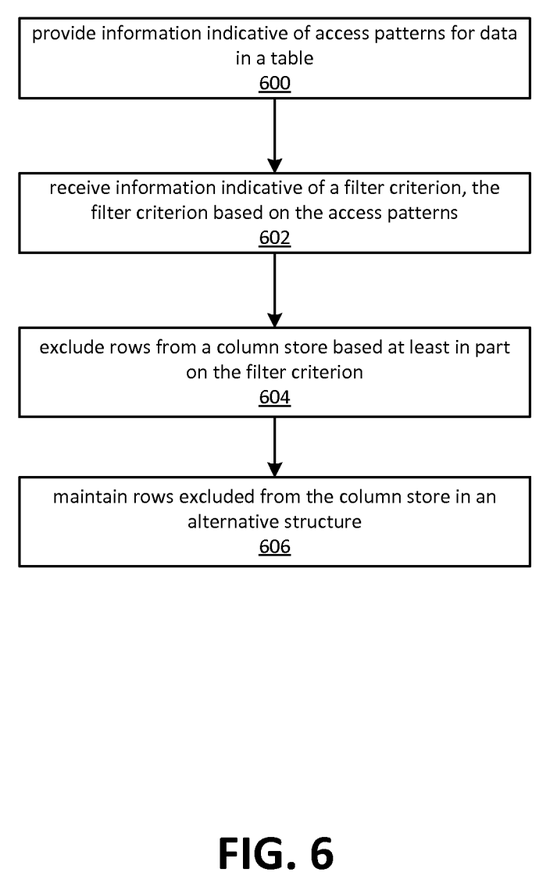
FIG. 6 is a flowchart depicting a filtering technique which may be employed to reduce processing costs associated with movement of data to a column store.

Referring now to FIG. 6, FIG. 6 is a flowchart depicting a filtering technique which may be employed to reduce processing costs associated with movement of data to a column store. Although as a sequence of blocks, in various aspects the depicted elements may be altered, omitted, supplemented with additional operations, or performed in parallel. Accordingly, the depicted order should not be construed as limiting the scope of the present disclosure.

Block 600 depicts the provision of information that is indicative of access patterns for data in a table. This operation may be performed in various aspects of the present disclosure, or may be omitted. If included in an aspect, the information may be indicative of hot or cold areas of data access. For example, certain rows may be accessed with a higher frequency, while others may be accessed with a lower frequency.

Block 602 depicts receiving information indicative of a filter criterion. The filter criterion may be based on the access patterns, and may for example specify a criterion for including or excluding hot or cold areas. For example, a filter criterion might exclude older rows which may be less likely to be updated, and include newer rows which may be more likely to be updated.

Block 604 depicts excluding rows from a column store based at least in part on the filter criterion. The filtering criterion may be used to filter out rows based on a created predicate set by a user or the system itself as described in block 602. Further, the filter criterion may be applied to rows migrating or copying over to a column store. For example, the user may set criteria that excludes, from the column store, newer data that may be more likely to be updated. Again, the predicate or instruction may be set by the user or the system itself to filter out some subset of rows from the column store.

Block 606 depicts maintaining rows excluded from the column store in an alternative structure. Typically, this may be a row-oriented store. In various aspects, rows excluded from the column store may be maintained in a base table.

In some aspects, the filtering technique should exclude from the column store rows that are likely to be modified within a shortened timeframe. In one aspect, the temperature of a row can be tracked and compression and/or movement of rows that have recently changed can be postponed. This technique may be used in particular for scenarios where the past transactions are usable for predicting the likelihood of future transactions occurring. In another aspect, the user or application can provide a predicate that determines in advance whether a row is cold based on its contents. For example, the user or application can indicate that any order row where "shipped=1" is to be treated as cold. This may allow the query processor to avoid scanning the column store for rows that cannot satisfy the predicate (for example, on behalf of a query that limits itself to orders which have not been shipped). In some aspects, this technique may be used in combination with postponement of compression and/or movement of rows that have recently changed.

Figure 7:
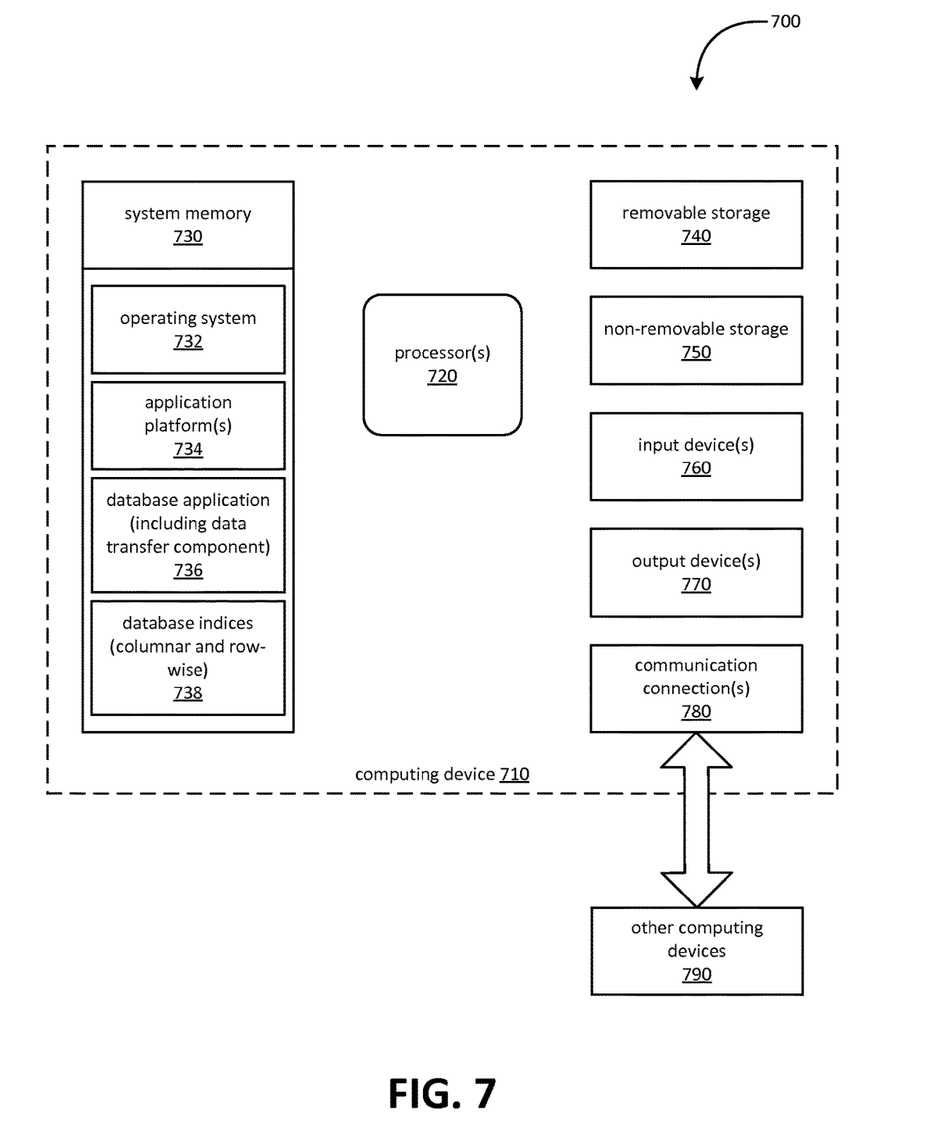
FIG. 7 is a block diagram of a computing environment including a computing device operable to support aspects of computer-implemented methods, computer program products, and system components as illustrated in FIGS. 1-6.

FIG. 7 depicts a block diagram of a computing environment 700 including a computing device 710 operable to support aspects of computer-implemented methods, computer program products, and system components according to the present disclosure. In an illustrative aspect, the computing device 710 may include one or more of the tables 120 of FIG. 1, the delta stores 150 of FIG. 1, the column store 130 of FIG. 1, the delete buffer 160 of FIG. 1, and the delete bitmap 140 of FIG. 1. Each of the tables 120 of FIG.

1, the one or more delta stores 150 of FIG. 1, the column store 130 of FIG. 1, the delete buffer 160 of FIG. 1, and the delete bitmap 140 of FIG. 1 may include or be implemented using the computing device 710 or a portion thereof.

The computing device 710 includes at least one processor 720 and a system memory 730. Depending on the configuration and type of computing device, the system memory 730 may be volatile (such as random access memory or "RAM"), non-volatile (such as read-only memory or "ROM," flash memory, and similar memory devices that maintain stored data even when power is not provided), or some combination of the two. The system memory 730 typically includes an operating system 732, one or more application platforms 734, one or more applications, and program data. For example, the system memory 730 may include a database application 736 and database indices 738 (e.g., columnar indices and row-wise indices).

In an illustrative aspect, the database application 736 may include a data transfer component that is configured to move rows from a delta store to a column store. In another illustrative aspect, the processor 720 may be configured to execute a query processing engine to execute database queries of the database application 736 that reference both columnar database indices and row-wise database indices.

The computing device 710 may also have additional features or functionality. For example, the computing device 710 may also include removable and/or non-removable additional data storage devices such as magnetic disks, optical disks, tape, and standard-sized or flash memory cards. Such additional storage is illustrated in FIG. 7 by removable storage 740 and non-removable storage 750. Computer storage media may include volatile and/or non-volatile storage and removable and/or non-removable media implemented in any technology for storage of information such as computer-readable instructions, data structures, program components or other data. The system memory 730, the removable storage 740 and the non-removable storage 750 are all examples of computer storage media. The computer storage media includes, but is not limited to, RAM, ROM, electrically erasable programmable read-only memory ("EEPROM"), flash memory or other memory technology, compact disks ("CD"), digital versatile disks ("DVD") or other optical storage, magnetic cassettes, magnetic tape, magnetic disk storage or other magnetic storage devices, or any other medium that can be used to store information and that can be accessed by the computing device 710. Any such computer storage media may be part of the computing device 710.

The computing device 710 may also have input device(s) 760, such as a keyboard, mouse, pen, voice input device, touch input device, etc. Output device(s) 770, such as a display, speakers, printer, etc., may also be included. The computing device 710 also contains one or more communication connections 780 that allow the computing device 710 to communicate with other computing devices 790 over a wired or a wireless network.

It will be appreciated that not all of the components or devices illustrated in FIG. 7 or otherwise described in the previous paragraphs are necessary to support aspects as herein described. For example, the removable storage 740 may be optional.

The illustrations of the aspects described herein are intended to provide a general understanding of the structure of the various aspects. The illustrations are not intended to serve as a complete description of all of the elements and features of apparatus and systems that utilize the structures or methods described herein. Many other aspects may be apparent to those of skill in the art upon reviewing the disclosure. Other aspects may be utilized and derived from the disclosure, such that structural and logical substitutions and changes may be made without departing from the scope of the disclosure. Accordingly, the disclosure and the figures are to be regarded as illustrative rather than restrictive.

It should be understood that the various techniques described herein may be implemented in connection with hardware or software or, where appropriate, with a combination of both. The subject matter presented herein may be implemented as a computer process, a computer-controlled apparatus or a computing system or an article of manufacture, such as a computer-readable storage medium.

The techniques, or certain aspects or portions thereof, may, for example, take the form of program code (i.e., instructions) embodied in tangible storage media or memory media implemented as storage devices, such as magnetic or optical media, volatile or non-volatile media, such as RAM (e.g., SDRAM, DDR SDRAM, RDRAM, SRAM, etc.), ROM, etc., that may be included in computing devices or accessible by computing devices. When the program code is loaded into and executed by a machine, such as a computer, the machine becomes an apparatus for practicing the disclosure. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the disclosure, e.g., through the use of an application programming interface ("API"), reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The previous description of the aspects is provided to enable a person skilled in the art to make or use the aspects. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed:

1. A database system that provides access to a compressed set of records respectively having a record identifier, the database system involving a device having a processor and comprising:
   a delta store that stores records indexed by a record key;
   a delete bitmap that stores record identifiers of records in the compressed set that have been deleted;
   a delete buffer that also that stores record identifiers of records in the compressed set that have been deleted; and a memory storing instructions that, upon execution by the processor, cause the database system to:
fulfill a request to insert an inserted record into the compressed set by initially inserting the inserted record into the delta store rather than into the compressed set;
fulfill a request to update an updated record of the compressed set by initially updating a version of the record in the delta store rather than in the compressed set;
fulfill a request to delete a selected record from the compressed set by initially storing the record identifier of the deleted record in the delete buffer rather than deleting the record from the compressed set;
periodically update the compressed set to:
transfer inserted records in the data store into the compressed set, and
transfer the record identifiers from the delete buffer to the delete bitmap; and
fulfill a query over the compressed set by aggregating:
matching records in the delta store; and
matching records in the compressed set that are absent from the delta store, the delete buffer, and the delete bitmap.

2. The database system of claim 1, further having stored thereon computer-readable instructions that, upon execution by the one or more computing devices, cause the system at least to:
delete a record from the compressed set in response to updating the compressed set.

3. The database system of claim 1, further having stored thereon computer-readable instructions that, upon execution by the one or more computing devices, cause the system at least to:
determine that a record has been deleted by performing at least one of using a key value to locate an additional record in the record set or using a position of the first record in the compressed set to access a second record in the compressed set.

4. The database system of claim 1, wherein a member of the compressed set is accessible based at least in part on a position of a record in the compressed set.

5. The database system of claim 1, further having stored thereon computer-readable instructions that, upon execution by the one or more computing devices, cause the system at least to:
determine to exclude one or more records of the compressed set based at least in part on a filter criteria selected based at least in part on a frequency of changes to the compressed set.

6. The database system of claim 1, further having stored thereon computer-readable instructions that, upon execution by the one or more computing devices, cause the system at least to:
store a sequence number with a record in the compressed set; and
determine that a row is in the logically deleted state based at least in part on the sequence number.

7. The database system of claim 1, wherein the compressed set comprises at least one of a tree structure or a hash table.

8. The database system of claim 1, further having stored thereon computer-readable instructions that, upon execution by the one or more computing devices, cause the system at least to:
determine to exclude one or more records of the compressed set based at least in part on a filter criteria selected based at least in part on a likelihood of the one or more records to be updated.

9. A computer-readable storage memory having stored thereon instructions that, upon execution by one or more computing devices, cause the one or more computing devices at least to provide access to a compressed set of records respectively having a record identifier, by:
providing a delta store that stores records indexed by a record key;
providing a delete bitmap that stores record identifiers of records in the compressed set that have been deleted;
providing a delete buffer that also that stores record identifiers of records in the compressed set that have been deleted;
fulfilling a request to insert an inserted record into the compressed set by initially inserting the inserted record into the delta store rather than into the compressed set;
fulfilling a request to update an updated record of the compressed set by initially updating a version of the record in the delta store rather than in the compressed set;
fulfilling a request to delete a selected row from the compressed set by initially storing the record identifier of the deleted record in the delete buffer rather than deleting the record from the compressed set;
periodically updating the compressed set to:
transfer inserted records in the data store into the compressed set, and
transfer the record identifiers from the delete buffer to the delete bitmap; and
fulfilling a query over the compressed set by aggregating:
matching records in the delta store; and
matching records in the compressed set that are absent from the delta store, the delete buffer, and the delete bitmap.

10. The computer-readable storage memory of claim 9, comprising further instructions that, upon execution by the one or more computing devices, cause the one or more computing devices to at least:
delete at least one additional record from the compressed set in response to updating the compressed set.

11. The computer-readable storage memory of claim 9, comprising further instructions that, upon execution by the one or more computing devices, cause the one or more computing devices to at least:
determine that a first record has been deleted by performing at least one of using a key value to locate an additional record in the delete buffer or using the position of the first record in the compressed set to access a second record in the compressed set.

12. The computer-readable storage memory of claim 9, comprising further instructions that, upon execution by the one or more computing devices, cause the one or more computing devices to at least:
determine to exclude one or more rows of the table from the compressed set based at least in part on a filter criteria.

13. The computer-readable storage memory of claim 9, wherein a member of the compressed set is accessible based at least in part on the position of a first record in the compressed set.

14. The computer-readable storage memory of claim 9, wherein the compressed set comprises at least one of a tree structure or a hash table.

15. The computer-readable storage memory of claim 9, comprising further instructions that, upon execution by the one or more computing devices, cause the one or more computing devices to at least:
   store a sequence number with a record of the compressed set; and
   determine that the record is in a logically deleted state based at least in part on the sequence number.

16. A computer-implemented method of providing access to a compressed set of records respectively having a record identifier, the method involving a device having a processor and:
   a delta store that stores records indexed by a record key;
   a delete bitmap that stores record identifiers of records in the compressed set that have been deleted; and
   a delete buffer that also that stores record identifiers of records in the compressed set that have been deleted,
and the method comprising: executing, by the processor, instructions that cause the device to:
   fulfill a request to insert an inserted record into the compressed set by initially inserting the inserted record into the delta store rather than into the compressed set;
   fulfill a request to update an updated record of the compressed set by initially updating a version of the record in the delta store rather than in the compressed set;
   fulfill a request to delete a selected row from the compressed set by initially storing the record identifier of the deleted record in the delete buffer rather than deleting the record from the compressed set;
   periodically update the compressed set to:
      transfer inserted records in the data store into the compressed set, and
      transfer the record identifiers from the delete buffer to the delete bitmap; and
   fulfill a query over the compressed set by aggregating:
      matching records in the delta store; and
      matching records in the compressed set that are absent from the delta store, the delete buffer, and the delete bitmap.

17. The computer-implemented method of claim 16, further comprising:
   deleting a record from the compressed set in response to updating the compressed set.

18. The computer-implemented method of claim 16, further comprising:
   determining that a first record has been deleted by performing at least one of using a key value to locate an additional record in the compressed set or using a position of the first record in the compressed set to access a second record in the compressed set.

19. The computer-implemented method of claim 16, further comprising:
   determining to exclude one or more rows of the compressed set based at least in part on a filter criteria.

20. The computer-implemented method of claim 16, wherein the compressed set comprises a set representation, wherein a member of the compressed set is accessible based at least in part on a position of a first record in the compressed set.

* * * * *